Figures 1, 2, 3:
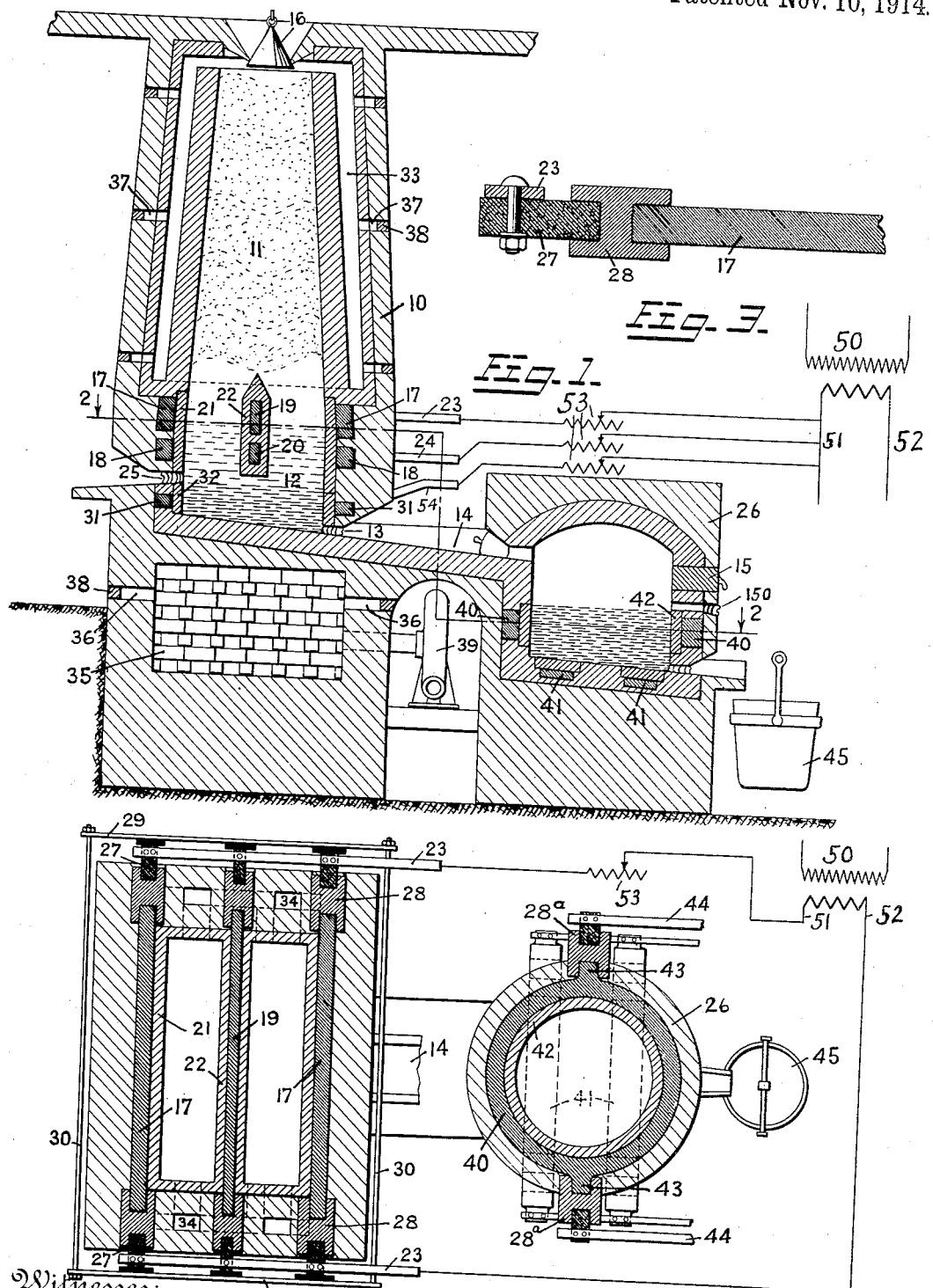

W. H. HAMPTON.
ELECTRIC FURNACE.
APPLICATION FILED FEB. 17, 1913.

1,116,884.

Patented Nov. 10, 1914.

Witnesses:
Eric B. Kramer
Frederick Kunz

Inventor
William H. Hampton
By his Attorney
W. F. Bissing

UNITED STATES PATENT OFFICE.

WILLIAM H. HAMPTON, OF NEW YORK, N. Y., ASSIGNOR TO THE CONLEY ELECTRIC FURNACE COMPANY, INCORPORATED, OF WILMINGTON, DELAWARE, A CORPORATION OF DELAWARE.

ELECTRIC FURNACE.

1,116,884.

Specification of Letters Patent. Patented Nov. 10, 1914.

Application filed February 17, 1913. Serial No. 748,853.

*To all whom it may concern:*

Be it known that I, WILLIAM H. HAMPTON, a citizen of the United States, residing in the city, county, and State of New York, have invented new and useful Improvements in Electric Furnaces, of which the following is a specification.

This invention relates to improvements in electrical metallurgical furnaces, the same being designed more especially for the reduction of iron ore.

One object of the invention is to provide a thoroughly practical and efficient furnace heated by resistance conductors for smelting iron ore without the use of air or a large amount of coke for supplying heat, the construction of the furnace enabling it to handle the material rapidly and in large quantities and to utilize the current to best advantage.

The invention also comprises a combination of a reducing furnace and a refining furnace or hearth, both heated by non-metallic resistance elements out of contact with the material, so that throughout the process the composition of the metal or alloy is unaffected by the carbon content of the conductors.

Other objects and features of the invention will appear hereinafter.

In the accompanying drawings illustrating the invention: Figure 1 is a vertical section through the furnaces; Fig. 2 is a horizontal section on the line 2—2 of Fig. 1; and Fig. 3 is a detail sectional view illustrating one of the high resistance heating elements and the manner of connecting it with the means for supplying it with current.

The apparatus is shown as comprising a reducing furnace 10 and a refining furnace or hearth 26. In the furnace 10 the iron ore is reduced to malleable iron or other condition, dependent upon the composition of the charge, and collects in the hearth 12, whence it may be tapped off from time to time, or continuously, through the exit, 13, and allowed to run through the gutter 14 to the refining furnace. Here the molten metal may be given such final treatment as may be desired, a slag opening 150 and a door 15 being provided through which any remaining slag may be removed and by means of which materials may be introduced to alter the composition of the metal. Thus spiegeleisen or other carbon or metal bearing alloy may be added to the malleable iron, so that by fusing with it the carbon or other content of the malleable iron will be raised and a steel of any desired character produced.

The reducing furnace 10 is a shaft furnace of considerably less height than a blast furnace. Its shaft 11 gradually increases in width downwardly and does not terminate in a bosh. At the bottom is the hearth 12, and above the hearth the interior walls of the furnace are preferably substantially vertical. These vertical walls preferably extend down to the bottom of the furnace so as to inclose the hearth.

The ore, which may be ground fine with good advantage to the process and without danger of loss by being blown away, since there is no blast, is fed into the top of the shaft through a suitable charging device 16, being mixed with limestone, or other flux, and the proper amount of coke for reduction, but without the large amount of carbon used in a blast furnace to burn in the air blast and thus furnish the heat necessary for the smelting. The furnace being closed to the access of air, though this does not mean that the top of the shaft must be sealed by a cover plate, and the reactions being those initiated or produced by the heat radiated from resistance conductors out of contact with the material, as presently described, the carbon content of the metal that will collect in the hearth 12 can be predetermined with exactitude by the amount of carbon in the charge.

The heat to effect the smelting is applied at a zone in the lower part of the furnace above the hearth. Here the charge is subjected to intense heat under which the iron oxid is reduced by the incandescent carbon and fuses. The carbon monoxid produced by the reaction rises through the charge in the shaft and there effects some reduction of the higher to lower oxids of iron. This zone of intense heating becomes the reducing zone, and it is here also where the fusion takes place. The zone may be regarded as located at the level of the upper part of the lower vertical walled portion of the furnace and as extending somewhat above the lower end of the flared shaft portion. It is heated by resistance bars, 17, 18 at the sides and 19, 20 crossing its interior. The bars 17, 18 are shown straight, but it will be obvious that with a circular furnace they could be curved or circular. The bars 17 and 18 are embedded in the side walls of the furnace, which are suitably built of brickwork and are electrically non-conducting, and are protected from the action of the material—and conversely the material is protected from the resistance elements,—by suitable non-conducting acid, basic or neutral linings 21 built into the inner faces of the walls and supported thereby independently of the resistance elements, so that the linings may be removed and repaired without disturbing the latter.

The crossing conductors 19, 20 are incased in a low wall 22 of material similar to the linings 21, or faced with such material, and this wall is substantially confined to the heating zone. The shaft of the furnace is left free and unobstructed by partitions and the upper edge of the wall 22 is ridged or tapered so as to part the material with minimum obstruction to its descent. The crossing conductors are in the nature of plates disposed with their sides vertical and are located in the wide portion of the shaft, which terminates in a wide hearth. One or more of the walls 22, with resistance conductors therein, may be employed, according to the size of the reduction chamber, but in any event wide spaces are left between them and the vertical side walls for the free descent of the material, and furthermore, the shaft is unconstricted, so that there is no danger of the charge bridging or choking at any point.

The resistance elements are of non-metallic character and are preferably made of a composition of clay and graphite, having the proportions of about forty per cent. (40%) of carbon to sixty per cent. (60%) of clay. Such conductors are of low conductivity and on the passage of a sufficient electric current become intensely hot, and their heat conducted through the walls and radiated into the interior produces a temperature unattainable in a blast furnace.

As indicated, the resistance elements supplying heat to the region of fusion and reduction are divided into two or more separate sets lying in different zones. Thus the elements 17, 19, 17 constitute one set and the elements 18, 20, 18 another set. The members of each set may be connected to the same bus-bars, 23 being the bus-bars for one set and 24 the bus-bars for the other set. These different sets of heaters in effect differentiate the general fusing and reducing zone into zones, in the first of which the material is fused by the heat furnished by the electrical resistance element and partly reduced by the action of the reducing carbon, while in the next, the reduction is completed and the material rendered more fluid so that the slag separates from the metal and may be drawn off through a slag exit 25. The upper set of resistance elements preferably extends a greater distance vertically than the lower, and the latter constitutes a source of more intense heat, so that the material is more highly heated as it descends. By separately supplying the two sets of elements with current it is possible to vary their heating effects independently and relatively to each other to obtain predetermined amounts of heat at definite, controllable temperatures instead of depending upon the uncertainties of fuel; and in general the provision of separate heaters, one above the other, enables the electric current to be utilized to greatest advantage for smelting of the ore.

A shown more particularly in Fig. 3, the high resistance elements are connected to low resistance terminals 27, preferably of pure carbon, by intermediate members 28 into which the resistance elements and the terminals are socketed. These members are of lower resistance than the heating bars, and are preferably of a similar composition, in the proportions of about sixty per cent. (60%) of carbon to forty per cent. (40%) of clay. They may be united to the terminals and high resistance elements by a cement consisting of molasses and carbon, which on passage of the current carbonizes and forms an intimate and non-arcing junction. As shown in Fig. 2, the said members 28 are embedded in and supported on the walls of the furnace; and the terminals 27 may be supported against sagging under the weight of the bus-bars by bars 29 bearing against and insulated from the carbon terminals and drawn inward by tie rods 30. The bus-bars are bolted to the carbon terminals or secured thereto in any desired manner.

The hearth of the furnace is heated by other, similar high resistance elements 31, which are designed to supply just sufficient heat to keep the reduced metal fluid. These elements and the metal are protected from each other by linings 32 similar to those already described.

Means are provided for utilizing the heat obtained from the carbon monoxide escaping from the top of the furnace. To this end a space or passage 33 is provided around the shaft to receive the gases as they pass from the top of the latter. This space connects by passages 34 with a chamber or space 35 located beneath the hearth and containing suitable checker work. Passages 36, 37 are provided for admitting air to either or both of these spaces, so that the gases can be burned either around the shaft, to assist in heating the material therein, or below the hearth to aid in keeping the molten metal fluid. Part or all of the air openings can be closed by suitable plugs 38.

The gases are exhausted from the furnace as by a fan or pump, indicated at 39, so the furnace operates under a pressure less than atmospheric. The gases can thus be conveyed away and utilized. By virtue of this lowered pressure air will enter either of the spaces 33, 35 to mix with the combustible gas, when the closures 38 are opened.

In operation the material mixed with fluxes and carbon, as indicated, is charged into the top of the shaft and descends as the smelting proceeds. Approaching the top of the crossing wall 22 it enters a viscous zone where the heat is already fusing the ore, thence flows at opposite sides of the wall and between the heating elements and under the intense heat there encountered melts and is reduced by the carbon, the reduced metal finally collecting in the hearth. If the charge fed into the shaft contained a slight deficiency of carbon, this metal will be malleable iron. By properly proportioning the charge, steel can be obtained direct in the reducing furnace, but it is in many instances more desirable to produce malleable iron or other metal and conduct it into a refining furnace, as already described, for further treatment. This furnace may be of an ordinary form, but it is distinguished by being heated by resistance conductors, 40, 41, which are like the heating elements of the reducing furnace, and like them, are embedded in non-conducting walls, and kept from contact with the metal, by linings 42. As shown these heaters may be located at the sides and bottom of the refining hearth. The refining furnace being preferably circular, the heating element 40 is in the form of a ring having projections 43 at diametrically opposite points which are connected to bus bars 44 by members 28ª similar to the members 28 already described. From the refining furnace the metal may be drawn off as desired into a ladle 45.

As indicated in Figs. 1 and 2 the degrees of heat produced by the different resistance elements may be independently and relatively controlled. 50 indicates a transformer, and 51, 52 the two sides of the secondary circuit. The resistance conductors are represented as connected in parallel in this circuit, each being controllable by a rheostat 53.

54 designates a bus bar of the hearth resistance element 31.

What I claim as new is:

1. An electrical reduction furnace closed to the air and having an unobstructed shaft, free from partitions, a hearth, and a fusing and reducing zone with non-conducting walls above the hearth and at the lower part of the shaft, the width of said zone being substantially as wide as the widest portion of the shaft, in combination with non-metallic heating bars of low conductivity at the sides of said zone, a low wall containing a non-metallic heating conductor traversing said zone with wide non-bridging spaces between said conductors.

2. An electrical reduction furnace having a hearth, an unobstructed, unconstricted shaft, and a region above the hearth and at the lower part of the shaft inclosed between substantially vertical walls heated by resistance bars embedded therein out of contact with the charge and traversed by one or more substantially vertical low walls similarly heated and spaced so as to permit free passage of the material.

3. An electrical reduction furnace having a shaft which increases in width downwardly and terminates in substantially vertical walls extending toward the hearth, the region embraced by the vertical walls being closed to the atmosphere and heated by non-metallic resistance bars at the sides thereof and also crossing it out of contact with and insulated from the charge and adapted to produce an intense heat on the passage of electric current.

4. An electrical reduction furnace having an unobstructed shaft, without partition walls, a hearth provided with a resistance heater for maintaining the fluidity of the metal therein, and a zone of intense heat above the hearth and at the lower part of the shaft closed to the access of air, said zone being provided with separate non-metallic resistance heaters located in the walls of the furnace and arranged one above the other and adapted to produce differential heating effects.

5. An electrical reduction furnace having a flaring shaft, a hearth at the wide portion of the shaft, and a zone of intense heat above the hearth and at the lower part of the shaft closed to the access of air, said zone being provided with separate resistance heaters located in the walls thereof and arranged one above the other and adapted to produce differential heating effects.

6. An electrical reduction shaft furnace closed to the access of air and heated by resistance conductors adapted to yield internal heat on the passage of electric current, and means for conducting combustible gases from the top of the shaft downward around the shaft and burning the same.

7. An electrical reduction shaft furnace heated by resistance conductors adapted to yield intense heat on passage of electric current, a space surrounding the shaft, a space beneath the furnace connected with the space around the shaft, means for supplying air for combustion to said spaces, and means for forcibly withdrawing the burned products from the latter space.

8. An electrical reduction furnace closed to the access of air and heated by resistance conductors which yield intense heat on passage of electric current, means for forcibly exhausting the gases from the furnace, and means for admitting air to the gases drawn from the furnace and burning them to assist in the heating.

9. In the reduction of iron, the combination of a reduction furnace closed to the access of air and comprising a shaft, a hearth and a zone of intense heating above the hearth having non-arcing non-metallic resistance conductors out of contact with the charge, and a refining furnace to which the molten metal flows from the hearth of the reduction furnace, said refining furnace being heated by similar resistance conductors out of contact with the molten metal.

10. In an electric furnace, the combination of a non-metallic high resistance conductor or heating element, a low resistance supply terminal, and a separate intermediate connecting member of material of lower resistance than the heating element, and greater resistance than the terminal, the heating element being socketed into and cemented to the said connecting member.

In testimony whereof, I have signed my name to this specification, in the presence of two subscribing witnesses.

WILLIAM H. HAMPTON.

Witnesses:
FREDERICK KUNZ,
LOUELLA F. LITTLE.